(12) United States Patent
Kohlenberg et al.

(10) Patent No.: US 9,449,166 B2
(45) Date of Patent: Sep. 20, 2016

(54) PERFORMING AUTHENTICATION BASED ON USER SHAPE MANIPULATION

(71) Applicant: Intel Corporation, Santa Clara, CA (US)

(72) Inventors: Tobias M. Kohlenberg, Portland, OR (US); Jerzy W. Rub, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/561,410

(22) Filed: Dec. 5, 2014

(65) Prior Publication Data

US 2016/0162677 A1    Jun. 9, 2016

(51) Int. Cl.
*H04L 9/32* (2006.01)
*G06F 21/36* (2013.01)
*G06F 3/0484* (2013.01)

(52) U.S. Cl.
CPC .............. *G06F 21/36* (2013.01); *G06F 3/0484* (2013.01)

(58) Field of Classification Search
CPC ..... H04L 63/20; H04L 63/08; H04L 63/083; G06F 21/31; G06F 21/36
USPC .............. 726/1–6, 17–19; 713/168; 382/115, 382/116, 117, 118, 124
See application file for complete search history.

(56) References Cited

U.S. PATENT DOCUMENTS

| | | | | |
|---|---|---|---|---|
| 7,035,444 B2 * | 4/2006 | Kunieda | ............ | G07C 9/00158 340/5.83 |
| 7,116,804 B2 * | 10/2006 | Murase | ............... | G06K 9/00154 382/119 |
| 7,953,983 B2 * | 5/2011 | Holt | .......................... | G06F 21/36 713/182 |
| 8,006,299 B2 * | 8/2011 | Suominen | ............... | G06F 21/64 713/183 |
| 2008/0301778 A1 * | 12/2008 | Fritz | ........................ | G06F 21/36 726/4 |
| 2012/0174214 A1 | 7/2012 | Huang et al. | | |

OTHER PUBLICATIONS

Fawaz A. Alsulaiman, et al, "Three-Dimensional Password for More Secure Authentication," IEEE Transactions on Instrumentation and Measurement, vol. 57, No. 9, Sep. 2008, 10 pages.

U.S. Appl. No. 14/493,613, filed Oct. 14, 2014, entitled "Performing Pairing and Authentication Using Motion Information," by Ned M. Smith, et al.

(Continued)

*Primary Examiner* — Hosuk Song
(74) *Attorney, Agent, or Firm* — Trop, Pruner & Hu, P.C.

(57) ABSTRACT

In one embodiment, an apparatus comprises: a first logic to receive a user selection of an authentication shape, the authentication shape to be displayed on a display of a system during a user authentication, associate at least one identity characteristic with each of a plurality of sides of the authentication shape, and receive a plurality of user indications each corresponding to a manipulation of the authentication shape to enable one of the plurality of sides of the authentication shape to be a prominent side of the authentication shape on the display; an encoding logic to encode an identification of the authentication shape, the at least one identity characteristic associated with each of the plurality of sides, and the plurality of user indications into an encoded value; a security logic to generate a secure authentication value based on the encoded value; and a secure storage to store the secure authentication value. Other embodiments are described and claimed.

23 Claims, 8 Drawing Sheets

(56) References Cited

OTHER PUBLICATIONS

Intel Corporation "Deeper Levels of Security with Intel Identity Protection Technology," 2012, 9 pages.
wikipedia.org., "IEEE 802.11i-2004," downloaded Aug. 6, 2014, 5 pages.
Frank McKeen, et al., "Innovative Instructions and Software Model for Isolated Execution," 2013, 8 pages.
Matthew Hoekstra, et al., "Using Innovative Instructions to Create Trustworthy Software Solutions," 2013, 8 pages.
Ittai Anati, et al., "innovative Technology for CPU Based Attestation and Sealing," 2013, 7 pages.
U.S. Appl. No. 14/472,645, filed Aug. 29, 2014, entitled "Pairing Computing Devices According to a Multi-Level Security Protocol," by Abhilasha Bhargav-Spantzel, et al.
U.S. Appl. No. 14/493,621, filed Sep. 23, 2014, entitled "Securely Pairing Computing Devices," by Avi Priev, et al.
Martez E. Mott, et al., "Leveraging Motor Learning for a Tangible Password System," CHI 2012, May 5-10, 2012, Austin, Texas, USA, 6 pages.

* cited by examiner

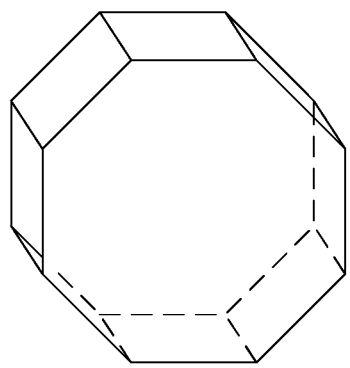
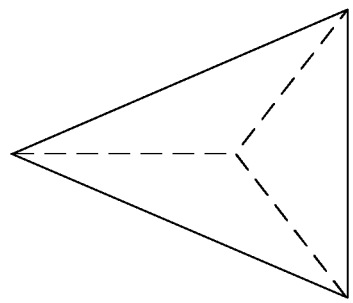
FIG. 1
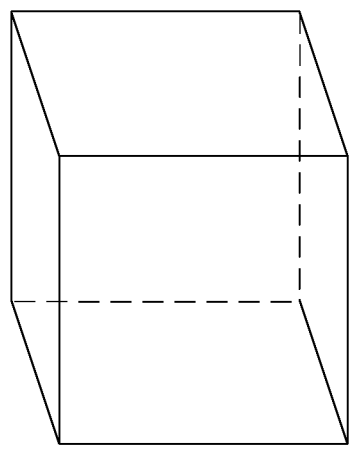

PERFORMING AUTHENTICATION BASED ON USER SHAPE MANIPULATION

TECHNICAL FIELD

Embodiments relate to user authentication systems for one or more computing devices.

BACKGROUND

In current computing environments, there are increasing concerns regarding improper access to resources, whether by way of rogue malware attacks, malicious user attacks or so forth.

To this end, many systems implement some form of user authentication. For example, the familiar login process for a user typically includes user input of a previously agreed upon password. While of minimal complexity to the user, password compromise is a concern. There are other authentication mechanisms that can provide greater protection; however such protection may come at the expense of greater burden on the user and thus degrading a user experience.

BRIEF DESCRIPTION OF THE DRAWINGS

FIG. 1 is an illustration of a presentation of a plurality of shapes on a display of a system in accordance with an embodiment of the present invention.

DETAILED DESCRIPTION

Figure 2:
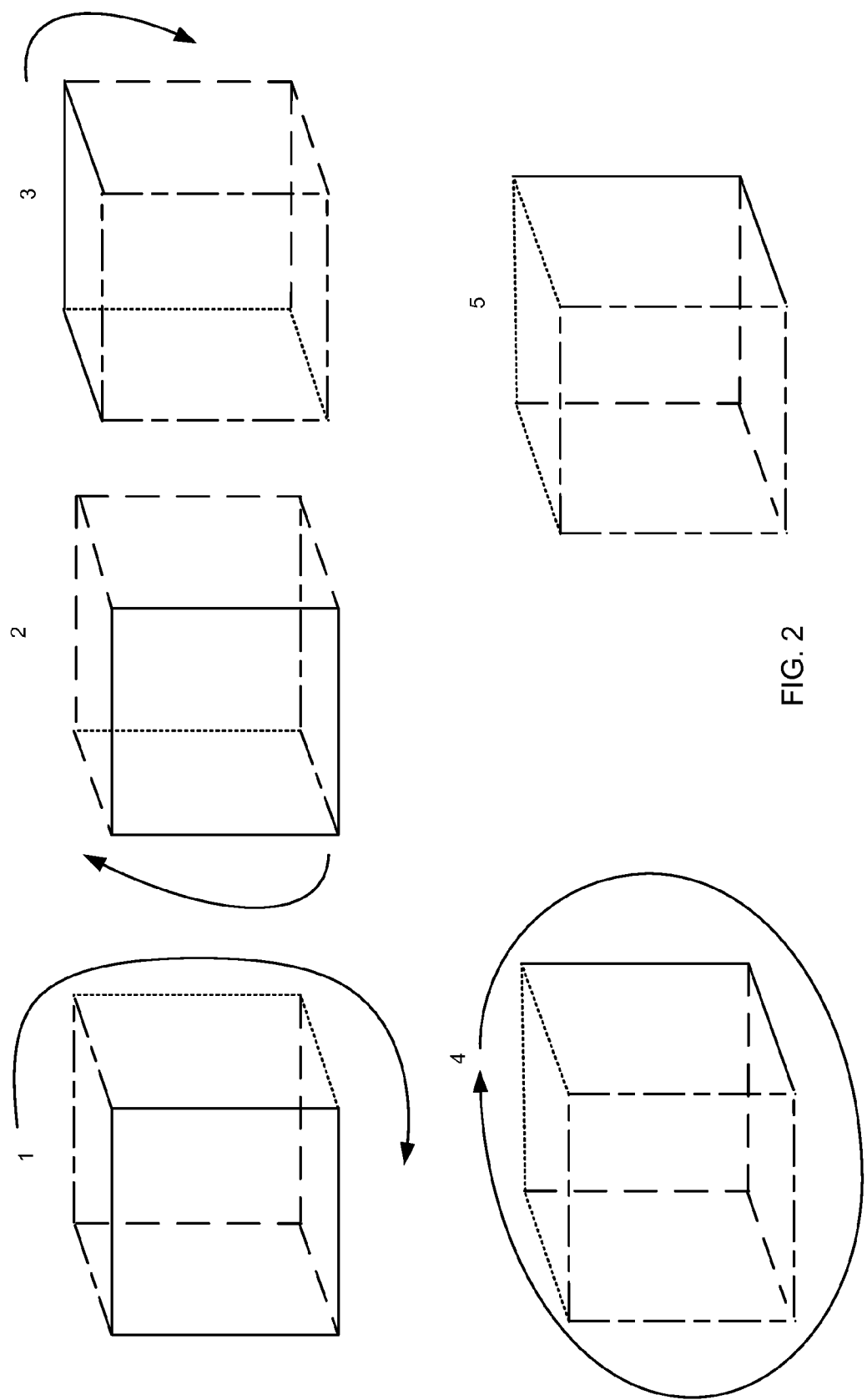
FIG. 2 is an illustration of a plurality of manipulations of an authentication shape by a user in accordance with an embodiment of the present invention.

In various embodiments, an authentication of a user to a computing system and/or one or more resources of the system may be performed by enabling user manipulation of a three-dimensional (3D) object to create a unique pattern of steps. Using an authentication as described herein, a strong measure of authentication can be realized combined with a positive user experience, particularly in computing environments that enable touch or gesture-based user input.

A three-dimensional shape (such as a cube) has a fixed number of sides (also referred to as faces) and vertices (edges and corners). By treating each of these sides (and possibly also the vertices) as a unique value, it is possible to use a sequence of presentation of faces or vertices to a predominant face (e.g., a front face) to generate a unique value that can be used as a type of "something you know" for purposes of authentication. In an embodiment, this sequence can integrate, in addition to the order of faces or vertices, the manner of movement or manipulation between the faces (e.g., turning clockwise vs. counterclockwise, up, or down), to provide additional distinguishing features. In different examples, single shape or multiple shape manipulation-based authentications may occur, depending on desired complexity.

Embodiments may leverage the innate strengths of a gesture-based system in a way that decreases the likelihood of catching the eye of bystanders during user authentication, while providing a high amount of potential entropy and leveraging human ability to remember physical movement patterns to make memorization easier.

To enable manipulation-based authentication, first a user training process is performed. In this training process, a user is presented with a series of shapes from which to select one or more authentication shapes. In different implementations, any multi-sided three-dimensional shape may be acceptable, and the complexity of the shape and number of shapes to be used may be defined by an authentication policy.

In some cases, each side of the authentication shape may be assigned one or more colors, patterns, textures or combinations thereof to allow each side to be unique for the user. In other cases, the sides may be assigned characters (e.g., alphanumeric characters), enabling a user shape manipulation-based manner of entering a password or PIN (and as discussed below, such input may be possible without first training the user to the shape and manipulation sequence using a previously stored password).

After shape selection and identifying characteristic assignment, the user may be queried to manipulate the shape based upon the complexity requirements of an authentication system. For instance, a user may be prompted to perform at least 8 manipulations of the shape. In an embodiment, the authentication system records information regarding: the details of the shape (including, for example, number of sides, identifying characteristics of each side (pattern, color, number, etc.); the sequence of sides that the user selects; the direction of rotation used to reach each side in the sequence; and the number of rotations used to reach each side in the sequence. In cases where multiple shapes are selected, the recorded information may further include the order in which the shapes are manipulated.

After recording of the information (e.g., by storage in a given storage medium), the information may be encoded and encrypted (e.g., by way of a hash operation) to create a unique value (e.g., a string) that can be matched against a result of a future authentication. In an embodiment, this encrypted value may be stored in an appropriate secure storage.

Then during system operation, when an authentication is requested, the user is presented with a number of shape choices including the original selected authentication shape. In some instances, the user may trigger the request for an authentication attempt by shaking the device and causing a visual representation of the shapes rolling and shuffling (similar to shaking a set of dice). In an embodiment, the presented shapes may be randomly ordered and oriented. In order to begin the authentication process, the user first selects the correct shape and rotates it to the correct starting orientation. Note that in some instances, the presented options may include shapes that have the same number of sides but do not have the correct features.

Referring now to FIG. 1, shown is an illustration of a presentation of a plurality of shapes on a display of a system. These shapes may be selected at random from a database of appropriate three-dimensional shapes (e.g., solid shapes) to be used for a training process of an authentication system. From these shapes, a user may select one of the shapes for purposes of performing a training process of an authentication technique. Assume for purposes of discussion that the user selects the cube shape as the authentication shape.

Next referring to FIG. 2, shown is a plurality of manipulations of this authentication shape by the user to train the authentication system for a series of user manipulations to later be used to authenticate the user to the system. As shown in FIG. 2, the cube is put through a series of manipulations, responsive to user input: rotated 180 degrees on the Z axis; rotated 90 degrees on the X axis; rotated 90 degrees on the Z axis; and rotated 360 degrees on the Z axis. Understand while shown with this simple set of user manipulations, in different embodiments, more complex manipulations may occur. After user input of these manipulations, the sequence is then encoded, along with the shape characteristics, and a given encryption technique (e.g., a hash operation) is performed to obtain a value to enable secure comparison against future authentication attempts.

Figure 3:
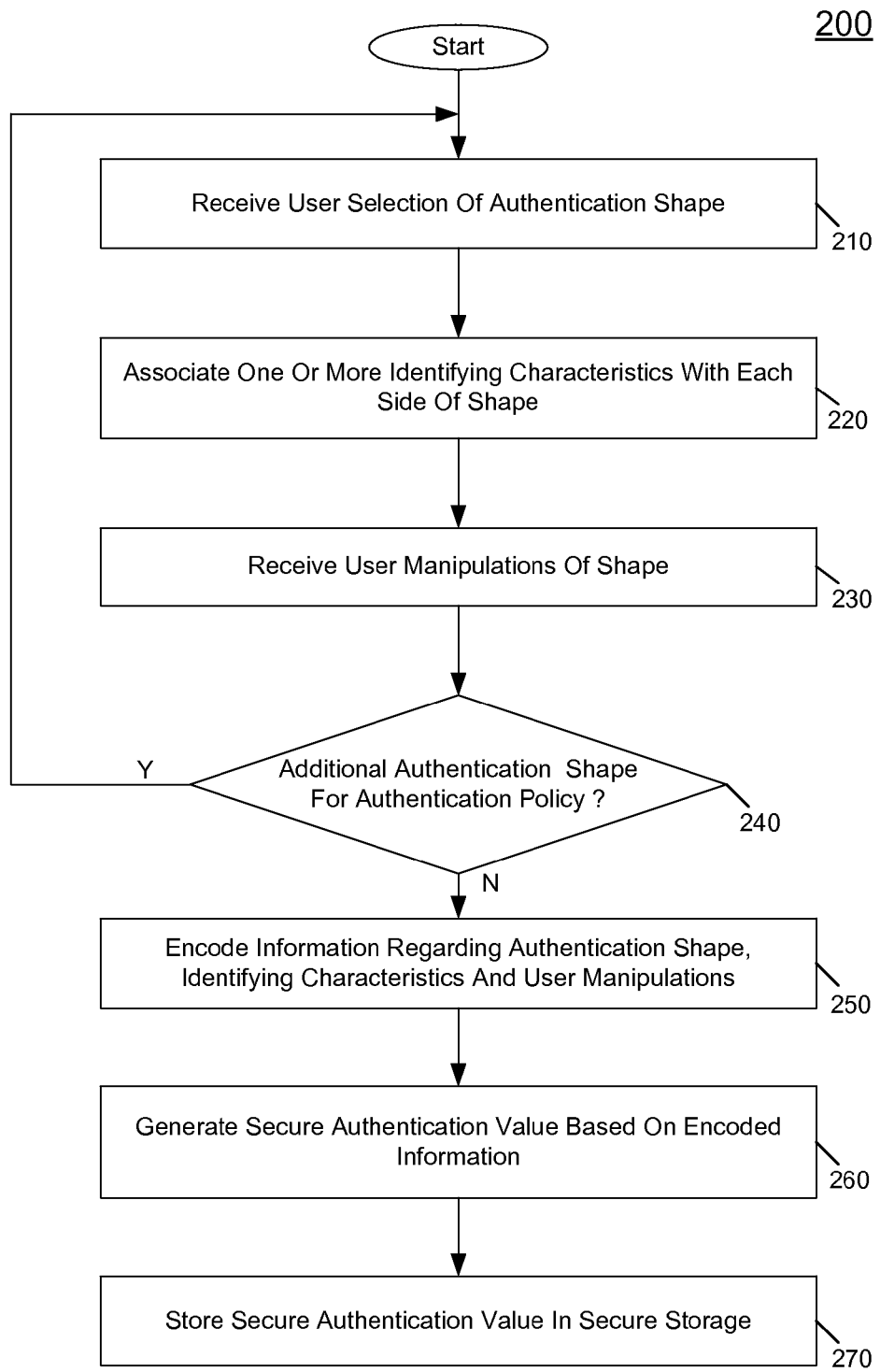
FIG. 3 is a flow diagram of a method for configuring an authentication mechanism in accordance with an embodiment of the present invention.

Referring now to FIG. 3, shown is a flow diagram of a method for configuring an authentication mechanism in accordance with an embodiment of the present invention. As shown in FIG. 3, method 200 may be performed by a variety of hardware, software, and/or firmware. In one embodiment, method 200 may be implemented by various portions of an authentication hardware logic or other such hardware, e.g., one or more microcontrollers configured to perform the method to train a user for the authentication mechanism. As seen, method 200 begins by receiving a user selection of an authentication shape (block 210). Receipt of this user selection may be by way of a given user input device such as a mouse, touchpad or other input device. Of course in other cases, other types of user input, including eye recognition, gesture recognition, user device movement, or so forth may be used. Understand also that this user selection of an authentication image may be responsive to display of multiple possible authentication images on a display such as a touch screen so that the user can, by way of a touch input, select one of the multiple authentication images. Such shapes may take the forms shown in FIG. 1 or 2 or any other simple or complex three dimensional shapes.

Still with reference to FIG. 3, control passes to block 220 where one or more identifying characteristics may be associated with each side of the shape. Again this association may be by way of user selection of the varying possible characteristics. Although the scope of the present invention is not limited in this regard, in an embodiment the identifying characteristics can include one or more of color, pattern, texture, or combinations thereof. To enable association of characteristics with each side, the user may be stepped through the different sides of the image by display of these sides in a manner that enables a given side to be placed in prominence, referred to herein as a prominent display of a side. That is, when a given side is prominently displayed, more of that side is presented as a forward face of the shape than the other sides in a manner that is readily identifiable to the user. Thus the user may select the one or more identifying characteristics by appropriate input (e.g., selection of one of the multiple colors, patterns, etc.).

After association of the identifying characteristics with the sides, control passes to block 230 where user manipulations of the shape may be received. In an embodiment, such user manipulations may be received by way of touch input that enables the user to move the authentication shape (e.g., by combinations of rotation, translation, spin or so forth). In examples without a touch screen interface, other user selections, by way of arrow keys or other predetermined keys of a keyboard, mouse or other touch input movements, user eye tracking, user gesture movements, among other user-based selections may be received to identify the user manipulations. At least a threshold number of user manipulations (e.g., according to a given authentication policy) may be received. Although the scope of the present invention is not limited in this regard, in one embodiment 8 user manipulations may be used as a threshold number.

Still with reference to FIG. 3, control next passes to diamond 240 to determine whether an additional authentication shape is required by a given authentication policy. For example, depending on the amount of authentication complexity/difficulty desired, more than one authentication shape may be required. Understand that the level of complexity of a given authentication policy may be dependent on the type of protection and/or the type of access being sought by the user. For example, for access to non-public, sensitive information such as personal or financial information, more than one authentication shape may be required, while in cases of authentication to enable access to a non-sensitive application such as a browser, only a single authentication shape may be required. If multiple such shapes are required, control passes back to block 210 above for execution of another loop of user selections. Understand also that the order of operations can vary, and the user manipulations of shape may come before the association of identifying characteristics, in some cases (or characteristic selection may be part of the manipulation selection process).

Control next passes to block 250 where an encoding process may be performed, e.g., by encoding logic, which may be part of the authentication logic. In this encoding process, the various information regarding the authentication shape described above, namely the shape itself, identifying characteristics for the sides, and the user manipulations, may be encoded into an encoded value. As one embodiment, the information may be set into a vector form with multiple fields, including a first field to encode the authentication shape, a second field to encode identifying characteristics (which may include a plurality of subfields each associated with a given side of the authentication shape and including one or more corresponding identifying characteristics for the side), and a third field to encode user manipulations (e.g., in the form of encodings of rotations, translations and other movements so that a subfield for manipulation information for each of selected multiple sides of the authentication shape to place a given side in a prominent display according to a selected sequence).

Next, a secure authentication value may be generated based on this encoded information (block 260). Although the scope of the present invention is not limited in this regard, in an embodiment a hash value may be generated using the encoded vector. Further, in some cases one or more values, e.g., the authentication shape or one or more identifying characteristics or so forth, may be used as the seed value. Or a predetermined seed value may be used to perform the hash. In either case, the resulting secure authentication value may be stored in a secure storage, such as a secure portion of a non-volatile memory or other location within the system. In some cases, the secure storage may be an isolated portion of the storage that is only accessible in a trusted execution environment, e.g., and also only accessible by the authentication logic, in some cases. Note that in cases where a predetermined seed value is not used to perform the hash, the portions of the encoded information used for the seed value also may be securely stored. Thus at this point a secure authentication value is appropriately stored and may later be used during normal system operation to authenticate the user. Understand while shown at this high level in the embodiment of FIG. 3, the scope of the present invention is not limited in this regard.

For example, in another case, instead of receiving the various user selections to associate an authentication shape and its characteristic values and user manipulations, a given authentication shape may be associated with a user password, such as a previously stored user password that the user previously provided to the system. In such cases, the need for a training process may be avoided, and instead for performing an authentication, an authentication shape can be automatically and randomly selected by the system and the pre-existing password characters (e.g., alphanumeric characters) each may be randomly assigned for display on a given side of the authentication shape. Then as will be described further below, during an authentication process, the user must manipulate the shape such that sides having the password characters are displayed in prominence in the appropriate sequence.

Figure 4:
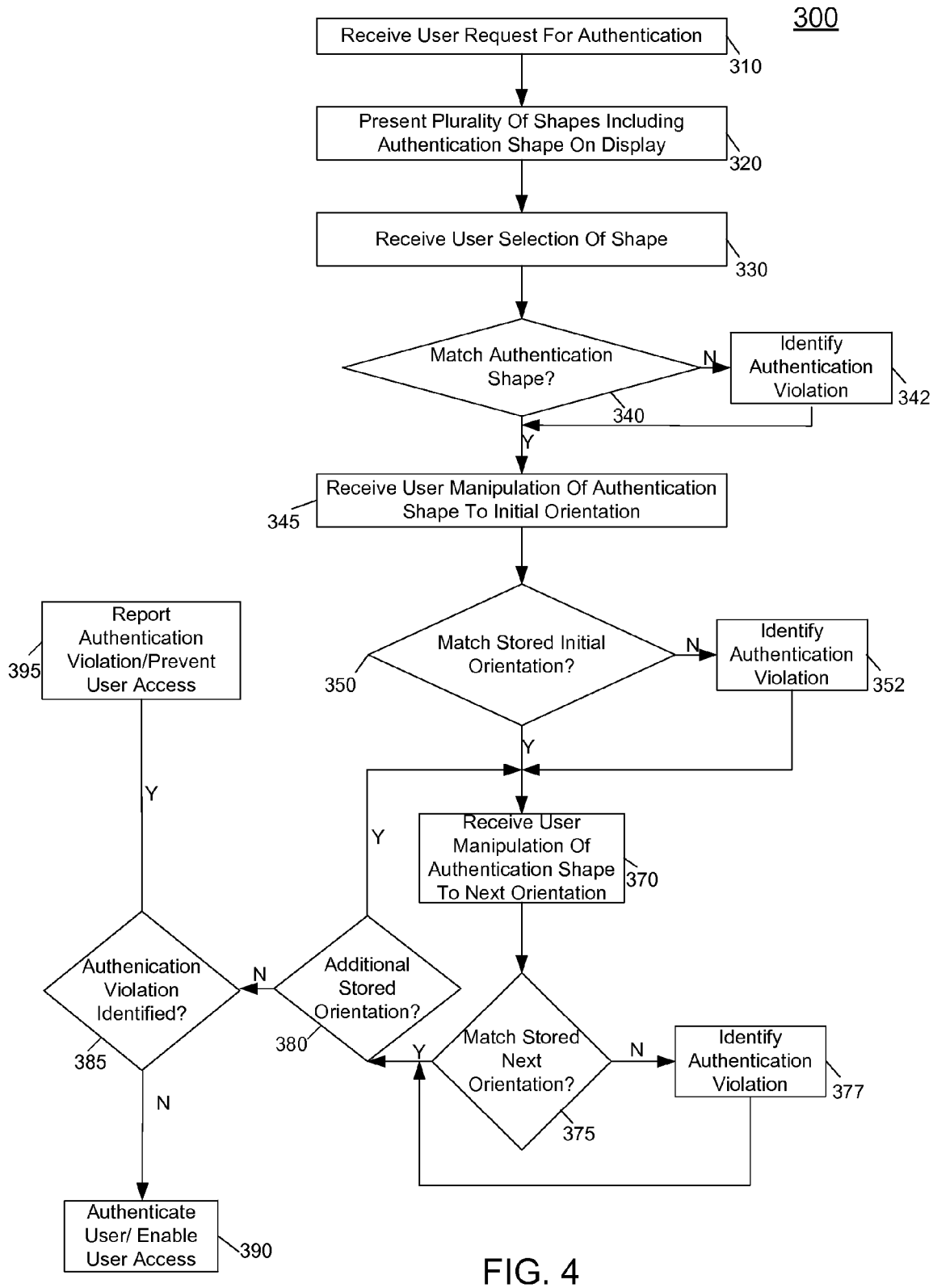
FIG. 4 is a flow diagram of an authentication method in accordance with an embodiment of the present invention.

Referring now to FIG. 4, shown is a flow diagram of an authentication method in accordance with an embodiment of the present invention. As shown in FIG. 4, method 300 may be performed by a variety of hardware, software, and/or firmware. In one embodiment, method 300 may be implemented by various portions of an authentication hardware logic or other such hardware, e.g., one or more microcontrollers configured to perform the method.

As seen, method 300 begins by receipt of a user request for authentication (block 310). Such request may be responsive to a user seeking to access the system or seeking access to a particular application for execution on the system (and/or seeking access to sensitive information). Understand that this user request may be received in connection with an identification of the user, e.g., according to a password prompt and/or user authentication by way of biometric or other means.

Still with reference to FIG. 4, at block 320 multiple shapes are presented on the display. These shapes include the authentication shape associated with the user and one or more additional shapes to thus require the user to select the previously agreed upon authentication shape from these multiple shapes. In an embodiment, the additional shapes may be selected randomly from a database of potential authentication shapes. Thus at block 330 a user selection of a shape is received. In an embodiment, the user selection may be by way of touch, mouse entry, gesture recognition or so forth. Next it is determined whether the user has selected the previously associated authentication shape (diamond 340). If not, an authentication violation is identified (block 342). This identification may be via recording and/or reporting of the violation to an access granting entity (e.g., verification logic within the authorization logic). Note however that the method continues after recording the violation, so the user is not apprised of the wrong shape selection (to protect against a future access attempt).

Still with reference to FIG. 4, if the user selects the correct authentication shape, control instead passes directly to block 345 where a user manipulation of the authentication shape to an initial orientation may be received. That is, in some cases the display of the authentication shape may be in a random orientation and to continue the user authentication, the user is to place the authentication shape into its initial orientation with reference to the previously agreed upon user manipulation scheme. At diamond 350 it is determined whether the user has placed the authentication shape into the correct initial orientation to thus match the stored initial orientation. If not, an authentication violation may be identified (block 352), as described above. Understand still further in other cases, the user may be presented the authentication shape and its correct initial orientation and thus in such cases block 345 and diamond 350 do not occur.

Next, control passes to block 370 where a user manipulation of the authentication shape may occur to place the shape into its next orientation. Again this manipulation is with reference to the previously stored sequence of user manipulations. Thus it is determined at diamond 375 whether this next orientation received from the user matches the stored next orientation. If not, a violation is identified (block 377) and control passes to diamond 380. Otherwise if a match is indicated, control passes directly to diamond 380, where it is determined whether additional stored orientations are present. If so, a loop occurs with blocks 370, diamond 375 and block 380. Otherwise, authentication is completed and control passes to diamond 385 to determine whether a violation has been identified. If so, control passes to block 395 where the authentication fails. In addition the authentication violation is reported, e.g., via the display. In addition, user access to a requested location or resource of the system is prevented.

Thus note that embodiments as part of user authentication track manipulations or changes of the authentication shape in any dimension (and not just a top or presented face). Embodiments further track user manipulations to a final state. As an example, different authentication results occur if an authentication shape (a cube, for example) is rotated four times (so the same face is shown) or the shape is not rotated at all (or rotated 8 times), such that the same face is presented.

Instead if authentication succeeds without violation, control passes from diamond 385 to block 390 where the user is authenticated and a user access to the requested location or resource is enabled. Understand while shown at this high level in the embodiment of FIG. 4, the scope of the present invention is not limited in this regard. For example, in situations where according to an authentication policy a user is to be presented with multiple shapes for selection and manipulation, method 300 may proceed serially on each shape.

Furthermore, in a situation as described above where a user does not perform a training process, but instead a previously stored user password is associated with an authentication shape, the authentication may proceed by prompting the user to manipulate a displayed authentication shape having a plurality of sides each including one or more elements of the user password (e.g., one or more alphanumeric characters). To have a successful authentication, the user is to manipulate the authentication shape to enable the corresponding sides of the authentication shape to be prominently displayed such that the correct sequence of password elements appear prominently in order. Otherwise, the authentication fails.

While the example above is directed to providing authentication for a system comprising a computing device such as a mobile platform, the scope of the present invention is not limited in this regard. As another example, embodiments may be used to apply digital rights management (DRM) to a printer device such as a 3D printer. Such printer may include an SoC or other processor to implement a TEE as described above. Responsive to user authentication, an authentication logic of such printer may enable the printer to perform a requested print operation. Embodiments may further be used to perform DRM as an attestation that a given product is licensed and/or manufactured according to one or more stated specifications. Stated another way, a system can attest to authenticity of one or more components of a system responsive to a user authentication.

Figure 5:
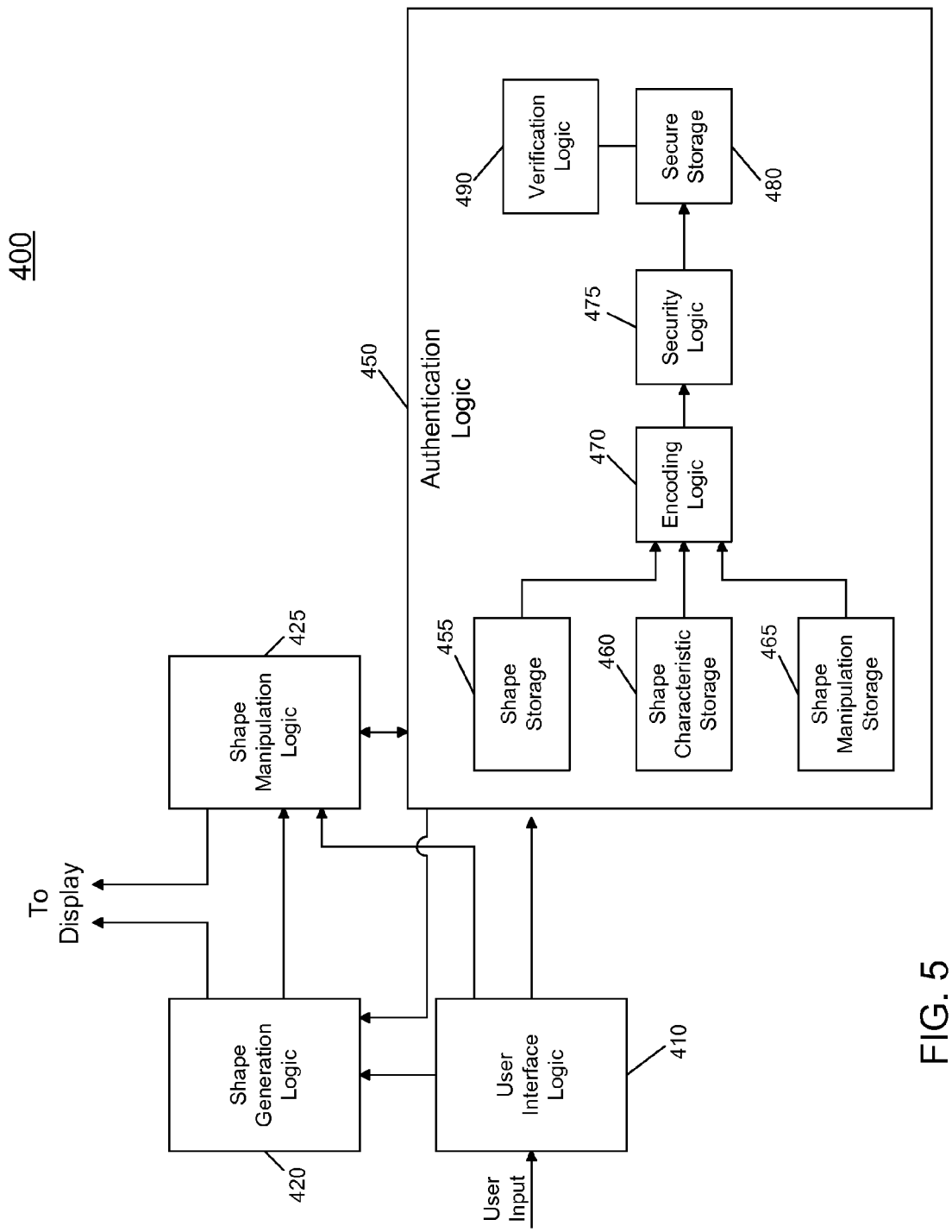
FIG. 5 is a block diagram of authentication hardware logic in accordance with an embodiment of the present invention.

Referring now to FIG. 5, shown is a block diagram of authentication hardware logic in accordance with an embodiment of the present invention. As shown in FIG. 5, hardware logic 400 may include various constituent components or logic. While in some cases such logic may take the form of specialized hardware or combinations of hardware, software and/or firmware, in other cases the hardware logic may be implemented at least in part using hardware of a general-purpose microprocessor, microcontroller or so forth. In some cases, at least some of the illustrated logic may instead be implemented using a graphics processor, such as one or more graphics engines of a general-purpose processor.

As illustrated in FIG. 5, authentication hardware logic 400 includes a shape generation logic 420 which may be configured to generate a variety of multi-dimensional shapes for display on a display. In some cases these shapes may be generated responsive to information from a user interface logic 410, which may include hardware to receive user input via a user input device such as a mouse, touchscreen, touchpad or other user input device, e.g., including one or more sensors, accelerometers or so forth. In addition, a shape manipulation logic 425 is further coupled to user interface logic 410. In an embodiment, shape manipulation logic 425 may be configured to manipulate a basic shape generated by shape generation logic 420. Such manipulations may take various forms, including providing of various colors, patterns, alphanumeric characters or other identifying characteristics to given sides of the shape. In addition, shape manipulation logic 425 may further be configured to manipulate a generated shape, e.g., responsive to user input to thus rotate, transform, spin, flip, or otherwise move the shape to enable prominent display of different faces or sides of the shape.

With further reference to FIG. 5, an authentication logic 450 may generally include various components to perform both the user configuring of an authentication shape during a training process and later user authentications based on this configured authentication shape during an authentication process. As seen, authentication logic 450 includes multiple storages, which in an embodiment may be implemented as separate portions of a single storage. As seen, these storages include a shape storage 455, which may store both a selected authentication shape as well as a set of other authentication shapes and a shape characteristic storage 460, which may store identifying characteristics for the various sides of a selected authentication shape. In turn, a shape manipulation storage 465 may store information regarding user manipulations to the authentication shape, e.g., the different user manipulations in terms of rotation directions and amounts (e.g., by way of degrees).

As seen, the information from these various storages may be provided to an encoding logic 470, which in an embodiment may generate an authentication vector that includes the information from the different storages in a given encoded format. Note that various types of encodings may be used in different embodiments. This encoded vector generated in encoding logic 470 may be provided to a security logic 475. In an embodiment, security logic 475 may perform a hash between the authentication vector and a seed value to generate a hash value. In some cases, security logic 475 may include one or more pre-stored seed values, one of which can be selected and used for purposes of hash generation. In other cases, a selected portion of the encoding information, e.g., with reference to the authentication shape and initial orientation, may be used as the seed value. In any case, a hash value is thus generated in security logic 475 and is stored in a secure storage 480 (and possibly along with the seed value, to enable later verification to be performed). Understand while shown at this particular location in FIG. 5, a secure storage may be located at various portions of a given system. In one case, security logic 475 and secure storage 480 may be implemented within a trusted platform module (TPM) or other security co-processor of a system (which in an embodiment may be implemented within a general-purpose processor such as a SoC or other multicore processor).

With further reference to FIG. 5, a verification logic 490 is present and is coupled to secure storage 480. In an embodiment, verification logic 490 may be configured to perform the authentication method of FIG. 4 to determine, with reference to the stored information in secure storage 480, whether a user has successfully selected an appropriate one or more authentication shapes and performed the appropriate user manipulations to thus authenticate the user. Understand while shown at this high level in the embodiment of FIG. 5, many variations and alternatives are possible.

Figure 6:
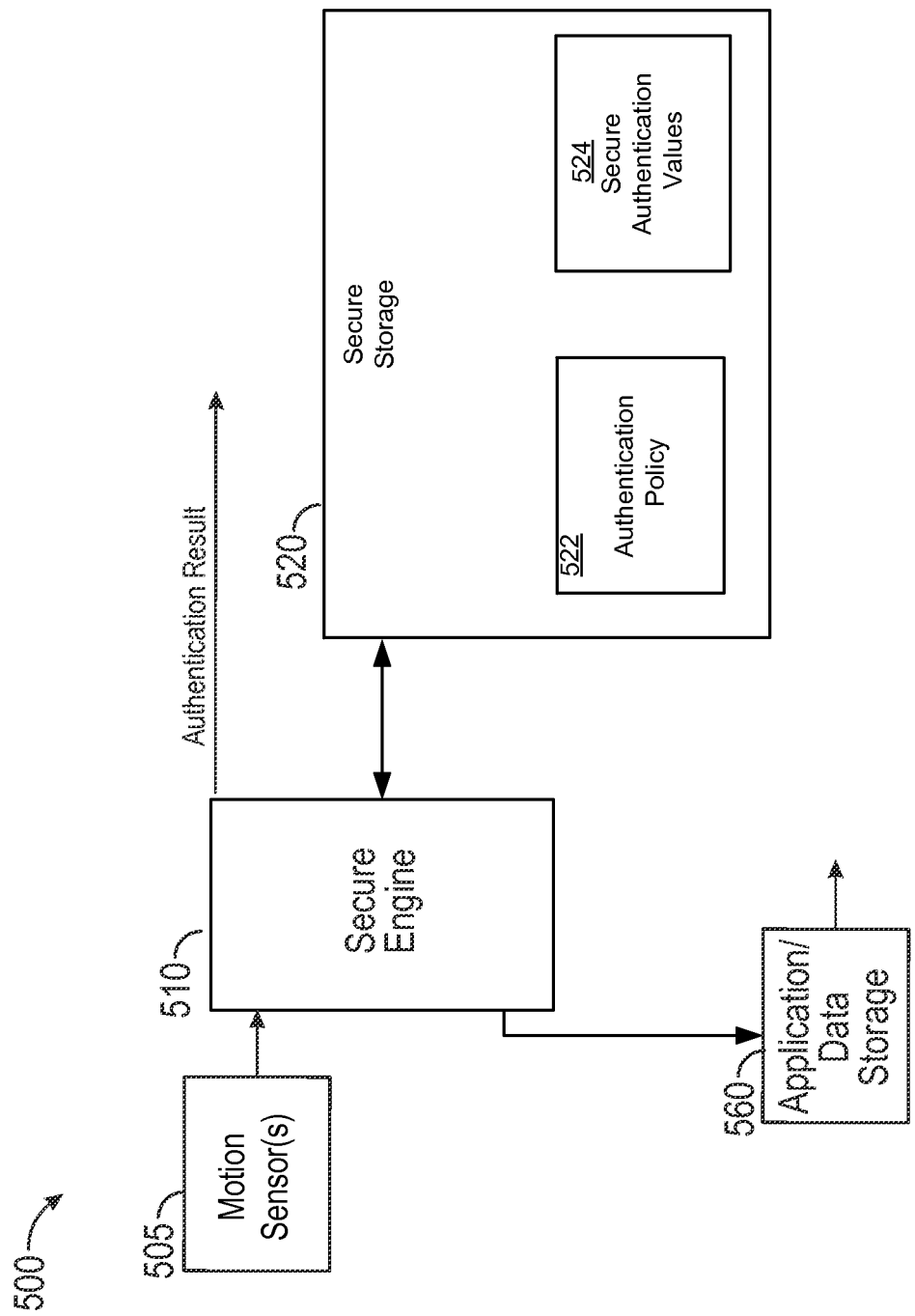
FIG. 6 is a block diagram of a portion of a system in accordance with an embodiment of the present invention.

Referring now to FIG. 6, shown is a block diagram of a portion of a system in accordance with another embodiment of the present invention. As shown in FIG. 6, system portion 500 may execute in a trusted execution environment (TEE) using combinations of the hardware shown in FIG. 6, along with corresponding firmware and/or software. In general, a system including portion 500 may operate in a TEE such that the authentication operations described herein are performed in a trusted and secure environment, where the system can attest to the security of the environment (and authenticate and attest to presence of an authenticated user). In general, portion 500 includes logic and storage to generate and maintain security and trust relevant values that are protected such that they are only accessible within portion 500 when executing in a TEE. In addition, various user inputs, whether by motion or other user authentication procedures, may be received via one or more trusted paths in portion 500.

As seen, one or more motion sensors 505 are provided to receive user motion information. Types of motions sensors vary in different examples and can include multi-axis accelerators, positioning sensors, orientation sensors, one or more capture sensors, among others. In other cases, user input may be received via touchscreen, touchpad, mouse, keyboard or so forth. In turn, user input information from such sources is provided to a security engine 510, which in different implementations may be a standalone security processor (such as a hardware TPM) or security logic (such as a separate low complexity core) included within a general-purpose processor such as a multicore processor or other SoC, and which in an embodiment may include authentication hardware logic 400 of FIG. 5.

As further seen, a training process may be performed to enable user selection of an authentication shape, characteristic information, and user manipulations according to an authentication policy stored in a first portion 522 of a secure storage 520. From this training process, a secure authentication value for the user may be generated and stored in a second portion 524 of secure storage 520.

At this point, it is assumed that the user is authenticated, and desires at a later time to be authenticated. To this end, authentication procedures may be performed to authenticate the user via user manipulation of a solid shape. In an embodiment, secure engine 510 may generate an authentication result, e.g., to indicate whether a given user is authenticated according to a given solid shape rotation authentication process, as dictated by the authentication policy. In an embodiment, the authentication policy may provide for a multi-factor authentication, such as by way of a given combination of biometric input, password, motion, or other user-based input, in addition to the user manipulations. When a user is authenticated, the user may obtain access to data and other information, e.g., as stored in an application/data storage 560. Understand while shown at this high level and with a limited number of components in the embodiment of FIG. 6, the scope of the present invention is not limited in this regard.

Figure 7:
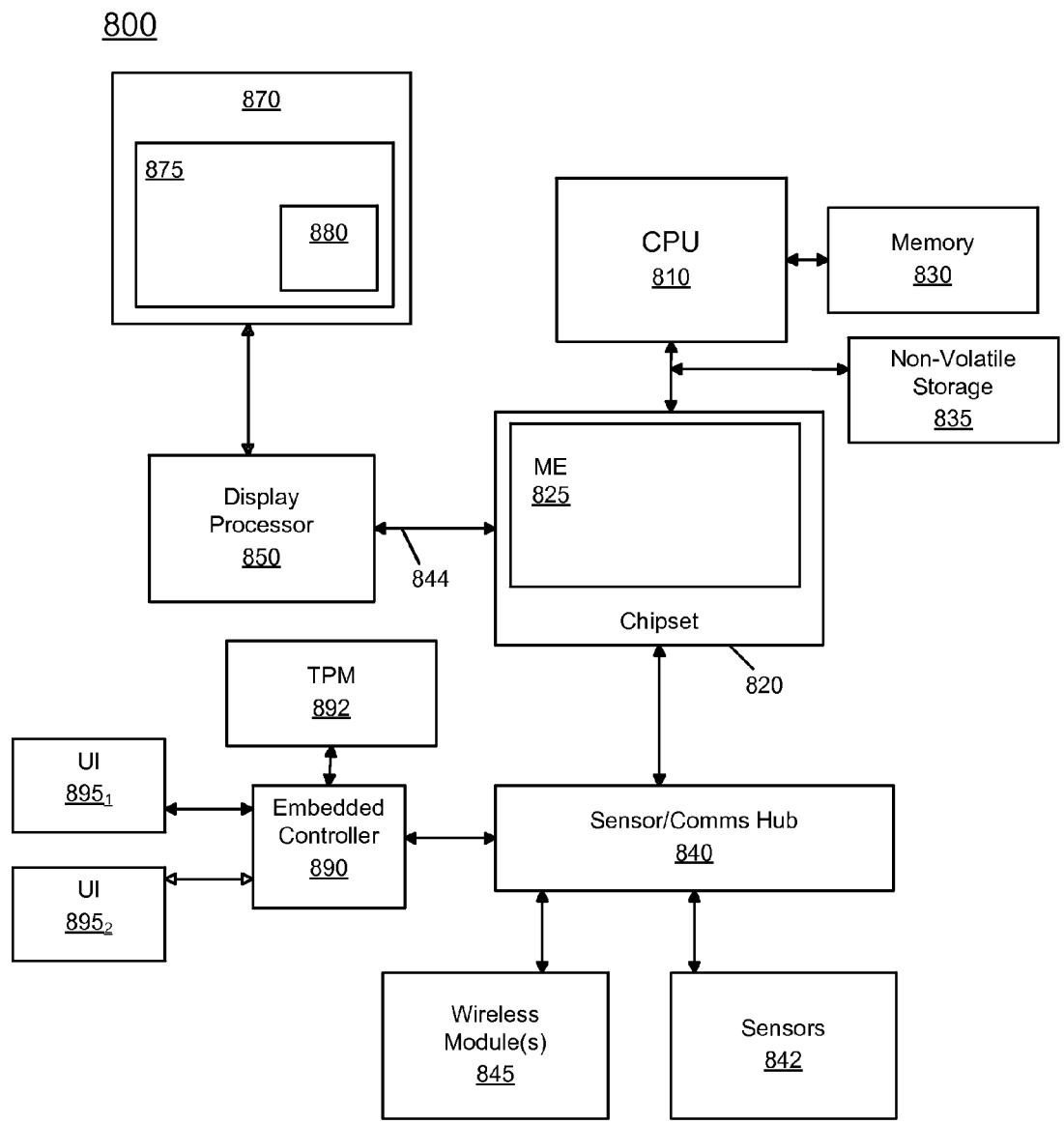
FIG. 7 is a block diagram of a system arrangement in accordance with an embodiment of the present invention.

Referring now to FIG. 7, shown is a block diagram of a system arrangement in accordance with an embodiment of the present invention. As seen in FIG. 7, system 800 may be a user platform such as a mobile device, tablet, phablet, personal computer (or other form factor) and includes a CPU 810. In various embodiments, this CPU may be a SoC or other multicore processor and can include secure execution technologies to set up a trusted execution environment to be used as described herein. In different embodiments, the TEE may be implemented using Intel® SGX technology, Intel® TXT technology, or an ARM TrustZone. To this end, implementations may include various hardware, both general-purpose and specialized security hardware, to create a TEE and perform solid shape rotation-based authentication operations in such environments.

As seen in the embodiment of FIG. 7, CPU 810 may be coupled to a chipset 820. Although shown as separate components in the embodiment of FIG. 7, understand that in some implementations chipset 820 may be implemented within the same package as CPU 810, particularly when the CPU is implemented as an SoC. Chipset 820 may include a manageability engine 825 which in an embodiment may be used to perform at least portions of the training and authentication protocols described herein. As further seen, various portions of a memory system couple to CPU 810, including a system memory 830 (e.g., formed of dynamic random access memory (DRAM)) and a non-volatile storage 835, at least portions of which may be a secure storage to store one or more secure authentication values and policy information as described herein, among other secure information.

In the embodiment of FIG. 7, additional components may be present including a sensor/communications hub 840 which may be a standalone hub or configured within chipset 820. As seen, one or more sensors 842 may be in communication with hub 840. For purposes of user authentication and device/context attestation, such sensors can include biometric input sensors, one or more motion sensor devices, and a global positioning system (GPS) module or other dedicated location sensor. In an embodiment, other sensors such as inertial and environmental sensors also may be present. As several examples, an accelerometer and a force detector may be provided and information obtained from these sensors can be used for the user shape manipulation-based authentication described herein. Also, in various embodiments one or more wireless communication modules 845 may be present to enable communication with local or wide area wireless networks such as a given cellular system in accordance with a 3G or 4G/LTE communication protocol.

As further seen in FIG. 7, platform 800 may further include a display processor 850 that can be coupled to chipset 820 via channel 844, which may be a trusted channel, in some embodiments. As seen, display processor 850 may couple to a display 870 that can be a touch screen display to receive user input such as responses to authentication requests. Thus in this example, configured within the display may be a touch screen 875 and a touch screen controller 880 (which of course is hidden behind the display itself). Other user interfaces, namely user interfaces 895₁ and 895₂ which in an example can include one or more gesture input devices, may be coupled via an embedded controller 890 to sensor/communications hub 830. Also, in the embodiment of FIG. 7, a hardware TPM 892 further couples to embedded controller 890, and may be used to perform at least portions of an authentication protocol.

Figure 8:
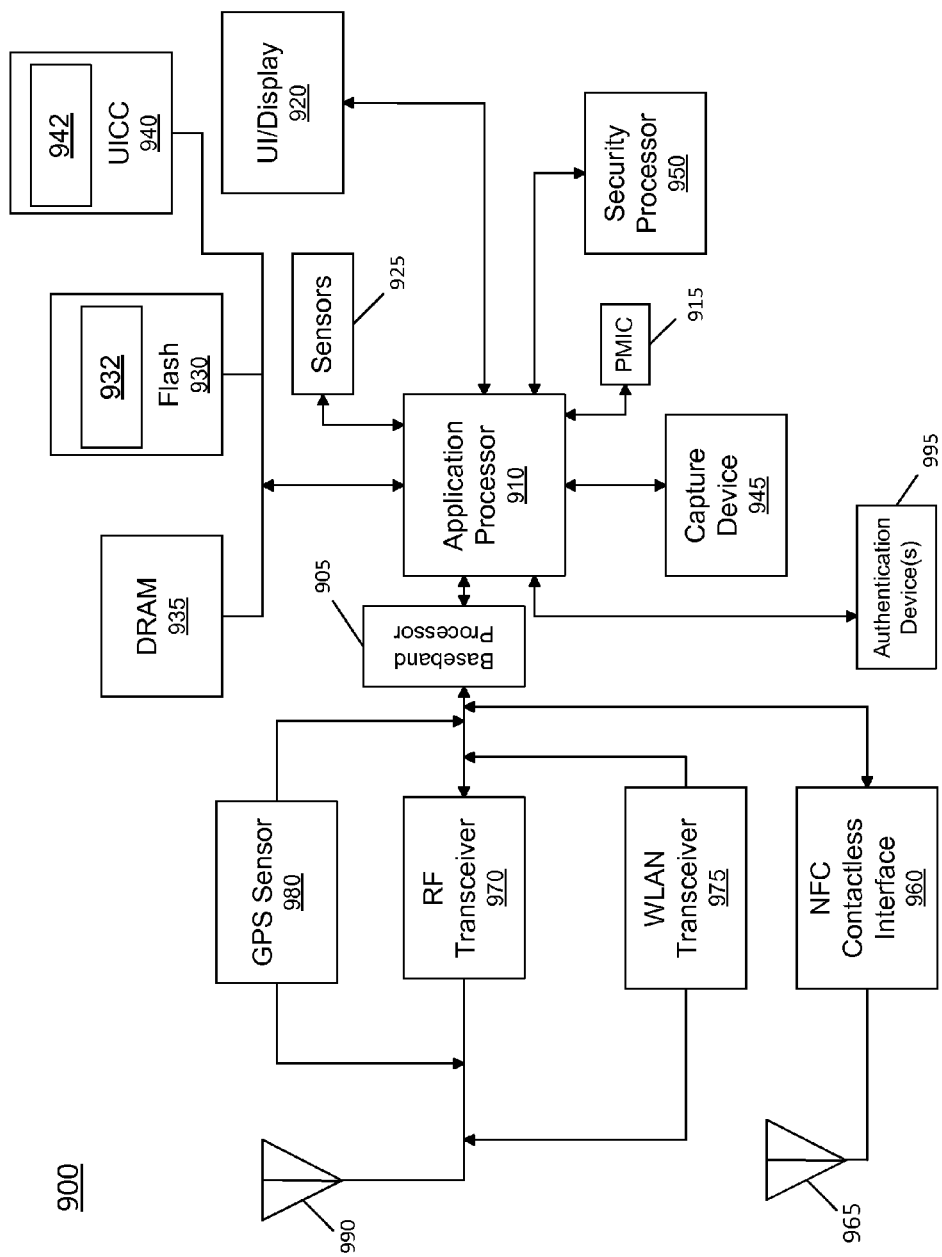
FIG. 8 is a block diagram of another example system with which embodiments can be used.

Referring now to FIG. 8, shown is a block diagram of another example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secure authentication values, among other secure information, and security policies (including policies for the user manipulation-based authentication as described herein) may be stored. As further seen, application processor 910 also couples to a capture device 945 such as one or more image capture devices that can record video and/or still images.

Still referring to FIG. 8, a universal integrated circuit card (UICC) 940 comprises a subscriber identity module, which in some embodiments includes a secure storage 942 to store secure user information. System 900 may further include a security processor 950 that may couple to application processor 910. In various embodiments, at least portions of the secure authentication techniques described herein may be performed using security processor 950, which may be used in part to set up a TEE. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 8, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Embodiments thus provide an authentication mechanism based on user manipulation of a 3D object in space. As such, embodiments leverage a pattern of movements/rotations/pauses of one or more 3D objects to authenticate a user. While the scope of the present invention is not limited in this regard, embodiments may be particularly appropriate for authentication using one or more user input devices and/or sensors, along with perceptual computing mechanisms, in a variety of devices including small form factor devices such as smartphones, tablets and so forth.

The following Examples pertain to further embodiments.

In Example 1, an apparatus comprises: a first logic to receive a user selection of an authentication shape, the authentication shape to be displayed on a display of a system during a user authentication, associate at least one identity characteristic with each of a plurality of sides of the authentication shape, and receive a plurality of user indications each corresponding to a manipulation of the authentication shape to enable one of the plurality of sides of the authentication shape to be a prominent side of the authentication shape on the display; an encoding logic to encode an identification of the authentication shape, the at least one identity characteristic associated with each of the plurality of sides, and the plurality of user indications into an encoded value; a security logic to generate a secure authentication value based on the encoded value; and a secure storage to store the secure authentication value.

In Example 2, the security logic of Example 1 is to perform a hash operation between the encoded value and a seed value to obtain the secure authentication value.

In Example 3, the first logic of Example 1 is optionally to cause presentation of a plurality of identity characteristics for association with a first side of the authentication shape and to enable the user to select the at least one identity characteristic for association with the first side therefrom.

In Example 4, the at least one identity characteristic to be associated with the first side is selected from a group including a pattern of the first side, a color of the first side, a texture of the first side, and an alphanumeric character associated with the first side.

In Example 5, the plurality of user indications is to be at least equal to a threshold number of indications according to an authentication policy stored in a policy storage.

In Example 6, the at least one identity characteristic comprises an alphanumeric character.

In Example 7, the association of the at least one identity characteristic with each of the plurality of sides of the authentication shape comprises a password formed of a plurality of alphanumeric characters each associated with one of the plurality of sides.

In Example 8, the apparatus of any one of the above Examples further comprises an authentication logic to present on the display a shape having a plurality of sides each to display at least one character of a user password stored in the secure storage.

In Example 9, the apparatus of Example 8 further comprises a verification logic to authenticate the user responsive to user manipulation of the shape according to a sequence in which each character of the user password is to be manipulated to a prominent side of the shape on the display in order of the user password.

In Example 10, the apparatus of any of the above Examples optionally includes a verification logic to authenticate the user responsive to user manipulation of the authentication shape according to a sequence corresponding to the plurality of user indications encoded into the encoded value.

In Example 11, the verification logic of Example 10 is to authenticate the user responsive to user selection of the authentication shape from a plurality of shapes displayed on the display and the user manipulation of the authentication shape according to the corresponding sequence, and otherwise to prevent user access to one or more resources of the system.

In Example 12, a system comprises: a processor having at least one core and a shape generation logic to generate a plurality of shapes for display on a display, the plurality of shapes including an authentication shape associated with a user to seek access to the system; an authentication logic, responsive to user selection of the authentication shape from the plurality of shapes, to determine whether the user has manipulated the authentication shape according to a stored sequence of manipulations associated with the user and if so, to authenticate the user; the display coupled to the processor; and at least one user input device to obtain the user selection and the user manipulation.

In Example 13, the authentication logic of Example 12, responsive to a determination that the user has not selected the authentication shape from the plurality of shapes or a determination that the user manipulation is not according to the stored sequence of manipulations, is optionally to report an authentication violation.

In Example 14, the authentication logic, responsive to a determination that the user has manipulated the authentication shape to an initial orientation, is to thereafter determine whether the user has manipulated the authentication shape to a plurality of orientations, the plurality of orientations associated with a training sequence of orientations from which the stored sequence of manipulations is obtained.

In Example 15, the at least one user input device comprises at least one sensor to detect user gestures, the user gestures to correspond to the user manipulation of the authentication shape.

In Example 16, the authentication logic of Example 12 is to encode at least the authentication shape and the user manipulation of the authentication shape into an encoded value, the user manipulation to cause a sequence of sides of the authentication shape in turn to be a prominent side of the authentication shape on the display.

In Example 17, the authentication logic of Example 16 is to determine whether the encoded value corresponds to a stored encoded value generated during a user training, and if so to enable the user to access at least one resource of the system.

In Example 18, the authentication logic of Example 17 is, during the user training, to receive a user selection of the authentication shape, associate at least one identity charac- teristic with each of a plurality of sides of the authentication shape, receive a plurality of user indications each corresponding to a manipulation of the authentication shape to enable one of the plurality of sides of the authentication shape to be a prominent side of the authentication shape on the display, and encode at least an identification of the authentication shape and the plurality of user indications into the stored encoded value.

In Example 19, the system comprises a printer, and the authentication logic is to enable the printer to perform a print operation responsive to the user authentication.

In Example 20, a method comprises: presenting a plurality of shapes including an authentication shape on a display of the system, the authentication shape corresponding to a shape associated with an authenticated user; determining whether a user selection of one of the plurality of shapes corresponds to the authentication shape; determining whether a plurality of orientations of the authentication shape presented on the display responsive to a user manipulation of the authentication shape corresponds to a second plurality of orientations of the authentication shape associated with the authenticated user; and if so, authenticating the user as the authenticated user and enabling the user to access at least a portion of the system, and otherwise reporting an authentication violation.

In Example 21, the method further comprises, if the user selection does not correspond to the authentication shape, identifying the authentication violation and delaying report of the authentication violation until completion of the user manipulation.

In Example 22, the method further comprises enabling the system to authenticate the user responsive to user manipulation of a second shape according to a sequence in which each character of a user password is to be manipulated to a prominent side of the second shape on the display in order of the user password, each of the plurality of sides of the second shape associated with one or more characters of the user password.

In Example 23, the method further comprises attesting to an authenticity of one or more components of the system responsive to the user authentication.

In Example 24, a machine-readable storage medium includes machine-readable instructions, when executed, to implement a method of any of the above Examples.

In Example 25, an apparatus comprises: first means for receiving a user selection of an authentication shape, the authentication shape to be displayed on a display of a system during a user authentication, associating at least one identity characteristic with each of a plurality of sides of the authentication shape, and receiving a plurality of user indications each corresponding to a manipulation of the authentication shape to enable one of the plurality of sides of the authentication shape to be a prominent side of the authentication shape on the display; an encoding means for encoding an identification of the authentication shape, the at least one identity characteristic associated with each of the plurality of sides, and the plurality of user indications into an encoded value; a security means for generating a secure authentication value based on the encoded value; and a secure storage means for storing the secure authentication value.

In Example 26, the security means of Example 25 is to perform a hash operation between the encoded value and a seed value to obtain the secure authentication value.

In Example 27, the first means of Example 25 is optionally to cause presentation of a plurality of identity characteristics for association with a first side of the authentication shape and to enable the user to select the at least one identity characteristic for association with the first side therefrom.

In Example 28, the at least one identity characteristic to be associated with the first side is selected from a group including a pattern of the first side, a color of the first side, a texture of the first side, and an alphanumeric character associated with the first side, and the plurality of user indications is to be at least equal to a threshold number of indications according to an authentication policy stored in a policy storage means.

Understand also that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first logic to receive a user selection of an authentication shape, the authentication shape to be displayed on a display of a system during a user authentication, associate at least one identity characteristic with each of a plurality of sides of the authentication shape, and receive a plurality of user indications each corresponding to a manipulation of the authentication shape to enable one of the plurality of sides of the authentication shape to be a prominent side of the authentication shape on the display;
an encoding logic to encode an identification of the authentication shape, the at least one identity characteristic associated with each of the plurality of sides, and the plurality of user indications into an encoded value;
a security logic to generate a secure authentication value based on the encoded value; and
a secure storage to store the secure authentication value.

2. The apparatus of claim 1, wherein the security logic is to perform a hash operation between the encoded value and a seed value to obtain the secure authentication value.

3. The apparatus of claim 1, wherein the first logic is to cause presentation of a plurality of identity characteristics for association with a first side of the authentication shape and to enable the user to select the at least one identity characteristic for association with the first side therefrom.

4. The apparatus of claim 3, wherein the at least one identity characteristic to be associated with the first side is selected from a group including a pattern of the first side, a color of the first side, a texture of the first side, and an alphanumeric character associated with the first side.

5. The apparatus of claim 1, wherein the plurality of user indications is to be at least equal to a threshold number of indications according to an authentication policy stored in a policy storage.

6. The apparatus of claim 1, wherein the at least one identity characteristic comprises an alphanumeric character.

7. The apparatus of claim 6, wherein the association of the at least one identity characteristic with each of the plurality of sides of the authentication shape comprises a password formed of a plurality of alphanumeric characters each associated with one of the plurality of sides.

8. The apparatus of claim 1, further comprising an authentication logic to present on the display a shape having a plurality of sides each to display at least one character of a user password stored in the secure storage.

9. The apparatus of claim 8, further comprising a verification logic to authenticate the user responsive to user manipulation of the shape according to a sequence in which each character of the user password is to be manipulated to a prominent side of the shape on the display in order of the user password.

10. The apparatus of claim 1, further comprising a verification logic to authenticate the user responsive to user manipulation of the authentication shape according to a sequence corresponding to the plurality of user indications encoded into the encoded value.

11. The apparatus of claim 10, wherein the verification logic is to authenticate the user responsive to user selection of the authentication shape from a plurality of shapes displayed on the display and the user manipulation of the authentication shape according to the corresponding sequence, and otherwise to prevent user access to one or more resources of the system.

12. A system comprising:
a processor having at least one core and a shape generation logic to generate a plurality of shapes for display on a display, the plurality of shapes including an authentication shape associated with a user to seek access to the system;
an authentication logic, responsive to user selection of the authentication shape from the plurality of shapes, to determine whether the user has manipulated the authentication shape according to a stored sequence of manipulations associated with the user and if so, to authenticate the user;
the display coupled to the processor; and
at least one user input device to obtain the user selection and the user manipulation.

13. The system of claim 12, wherein the authentication logic, responsive to a determination that the user has not selected the authentication shape from the plurality of shapes or a determination that the user manipulation is not according to the stored sequence of manipulations, to report an authentication violation.

14. The system of claim 12, wherein the authentication logic, responsive to a determination that the user has manipulated the authentication shape to an initial orientation, is to thereafter determine whether the user has manipulated the authentication shape to a plurality of orientations, the plurality of orientations associated with a training sequence of orientations from which the stored sequence of manipulations is obtained.

15. The system of claim 12, wherein the at least one user input device comprises at least one sensor to detect user gestures, the user gestures to correspond to the user manipulation of the authentication shape.

16. The system of claim 12, wherein the authentication logic is to encode at least the authentication shape and the user manipulation of the authentication shape into an encoded value, the user manipulation to cause a sequence of sides of the authentication shape in turn to be a prominent side of the authentication shape on the display.

17. The system of claim 16, wherein the authentication logic is to determine whether the encoded value corresponds to a stored encoded value generated during a user training, and if so to enable the user to access at least one resource of the system.

18. The system of claim 17, wherein the authentication logic is, during the user training, to receive a user selection of the authentication shape, associate at least one identity characteristic with each of a plurality of sides of the authentication shape, receive a plurality of user indications each corresponding to a manipulation of the authentication shape to enable one of the plurality of sides of the authentication shape to be a prominent side of the authentication shape on the display, and encode at least an identification of the authentication shape and the plurality of user indications into the stored encoded value.

19. The system of claim 12, wherein the system comprises a printer, and the authentication logic is to enable the printer to perform a print operation responsive to the user authentication.

20. At least one non-transitory computer readable storage medium comprising instructions that when executed enable a system to:
present a plurality of shapes including an authentication shape on a display of the system, the authentication shape corresponding to a shape associated with an authenticated user;
determine whether a user selection of one of the plurality of shapes corresponds to the authentication shape;
determine whether a plurality of orientations of the authentication shape presented on the display responsive to a user manipulation of the authentication shape corresponds to a second plurality of orientations of the authentication shape associated with the authenticated user; and
if so, authenticate the user as the authenticated user and enable the user to access at least a portion of the system, and otherwise to report an authentication violation.

21. The at least one non-transitory computer readable storage medium of claim 20, further comprising instructions that when executed enable the system, if the user selection does not correspond to the authentication shape, to identify the authentication violation and delay report of the authentication violation until completion of the user manipulation.

22. The at least one non-transitory computer readable storage medium of claim 20, further comprising instructions that when executed enable the system to authenticate the user responsive to user manipulation of a second shape according to a sequence in which each character of a user password is to be manipulated to a prominent side of the second shape on the display in order of the user password, each of the plurality of sides of the second shape associated with one or more characters of the user password.

23. The at least one non-transitory computer readable storage medium of claim 20, further comprising instructions that when executed enable the system to attest to an authenticity of one or more components of the system responsive to the user authentication.

\* \* \* \* \*